United States Patent [19]

Paulinski

[11] 4,093,851
[45] June 6, 1978

[54] MEANS AND METHODS FOR DETECTING THE POSSIBILITY OF A FAILURE OCCURRING IN THE OPERATION OF A DIGITAL CIRCUIT

[75] Inventor: Ronald Adam Paulinski, Goleta, Calif.

[73] Assignee: Burroughs Corporation, Detroit, Mich.

[21] Appl. No.: 754,311

[22] Filed: Dec. 27, 1976

[51] Int. Cl.² ............................................. G06F 11/00
[52] U.S. Cl. ........................... 235/302.2; 340/146.1 R
[58] Field of Search .................. 340/146.1 R; 325/42, 325/323; 328/108, 111; 329/104, 106; 307/231, 234; 235/153 A, 153 R, 302.2, 304

[56] References Cited

U.S. PATENT DOCUMENTS

| | | | |
|---|---|---|---|
| 3,386,079 | 5/1968 | Wiggins | 340/146.1 R |
| 3,396,369 | 8/1968 | Brothman et al. | 340/146.1 R |
| 3,548,176 | 12/1970 | Shutler | 235/153 A |
| 3,548,177 | 12/1970 | Hartlipp et al. | 235/153 A |
| 3,548,178 | 12/1970 | Carnevale et al. | 235/153 A |
| 4,032,884 | 6/1977 | Gutleber | 325/323 |
| 4,034,340 | 7/1977 | Sant'Agostino | 325/323 |

*Primary Examiner*—Charles E. Atkinson
*Attorney, Agent, or Firm*—Nathan Cass; Kevin R. Peterson; Edward J. Feeney, Jr.

[57] ABSTRACT

Improved means and methods for detecting the possibility of a failure occurring in the operation of a digital circuit when operating in a normal manner in a data processing system without any previous or present failure having occurred. In a particular preferred embodiment, the potential possibility of a failure occurring in a clocked digital circuit is detected by determining whether an input signal applied to the digital circuit is stable for a predetermined minimum time period relative to the clock.

11 Claims, 4 Drawing Figures

MEANS AND METHODS FOR DETECTING THE POSSIBILITY OF A FAILURE OCCURRING IN THE OPERATION OF A DIGITAL CIRCUIT

CROSS REFERENCE TO RELATED APPLICATION

Potential Failure Detecting Circuit Having Improved Means For Detecting Transitions in Short Duration Signals, Ser. No. 754,429, filed Dec. 27, 1976.

BACKGROUND OF THE INVENTION

This invention relates generally to improved means and methods for improving the reliability of operation of digital circuits such as employed in digital data processing systems.

As data processing systems continue to proliferate in our modern society, it is becoming of increasing importance to provide greater reliability of operation of such data processing systems. While there is considerable current effort to provide improved techniques for diagnosing operating failures after they have occurred, much less attention is being given to the problem of determining how circuits and systems should be designed and tested in the first instance so as to reduce if not eliminate the possibility of the occurrence of such operating failures.

SUMMARY OF THE PRESENT INVENTION

Accordingly, it is the broad object of the present invention to provide improved means and methods useful in providing digital data processing systems having greater reliability.

A more specific object of the present invention is to provide improved means and methods for detecting the possibility of a failure occurring in the operation of a digital circuit when incorporated in a digital data processing system.

An additional object in accordance with the foregoing objects is to provide for the detection of the possibility of a failure occurring in the performance of a digital circuit even though the digital circuit is not structurally defective.

A further object of the invention in accordance with the foregoing objects is to provide for the detection of the possibility of a failure occurring in the performance of a digital circuit contained in a digital data processing system even though no failure has occurred in the operation of the system and/or in the operation of the digital circuit.

A further object of the present invention is to provide improved circuit means for detecting a potential failure in the operation of a digital circuit during normal operation of the system and in the absence of any failure.

Briefly, detection of a potential failure in a digital data system in accordance with a preferred embodiment of the invention may be provided as follows. First, provision is made for operating the system in a normal manner. If a failure is detected, any of a variety of known diagnosing techniques may be employed to eliminate the cause of the failure, such as for example testing one or more of the digital circuits contained in the system for the presence of a defect. If no failure is detected, the preferred embodiment of the invention then provides for the testing of one or more digital circuits under actual operating conditions to determine whether the circuit is being operated in the system in a manner which would violate one or more predetermined operating criteria established for the circuit, such as, for example, one or more of the operating criteria provided by the manufacturer of the circuit.

In the preferred embodiment of the present invention exemplified herein, a clocked digital circuit responsive to the trailing edge of the clock is selected for testing and particular operating criteria thereof are selected to be tested in order to detect the possibility of the occurrence of a failure in the operation of the circuit. The selected operating criteria for the preferred embodiment are that: (1) the digital input signal applied to the circuit be stable for a predetermined minimum time period prior to the occurrence of the trailing edge of the clock and (2) the input signal remain stable for a predetermined time period subsequent to the occurrence of the trailing edge of the clock. If either of these two criteria are violated during actual operation of the digital circuit under test, it is considered an indication of a potential failure in the performance of the circuit, even though no failure has occurred or is currently occurring.

The rationale for the above approach to potential failure detection of a digital circuit will become evident by recognizing that production versions of a data processing system may contain digital circuits having different operating tolerances and safety factors from those employed in the production prototype as well as being intended for use in different operating environments. Thus, successful performance of a digital circuit in a production prototype model is no guarantee that a like digital circuit will successfully perform in a similar manner in production units. The preferred embodiment of the present invention is accordingly a most desirable way of detecting a potential failure possibility of a digital circuit in a data processing system by providing for the determination of whether predetermined criteria are being met during actual operation of the system even though no failure has occurred or is presently occurring. It will be understood that the predetermined criteria may typically be chosen based on a determination of predicted characteristics of each signal being tested which will be considered as acceptable in order to obtain reliable operation of the circuit under worst case conditions.

The present invention also additionally provides a particularly advantageous potential failure testing circuit useful with high speed digital circuits which takes advantage of inherent circuit delays to provide signals indicating the occurrence of transitions in a relatively short duration input signal for comparison with a "window" representative of the previously mentioned criteria applicable to the circuit being tested.

The specific nature of the invention as well as other objects, features, advantages and uses thereof will become apparent from the following description of a preferred embodiment and the accompanying drawings.

BRIEF DESCRIPTION OF THE DRAWINGS

Like numerals and characters designate like elements throughout the drawings.

Figure 1:
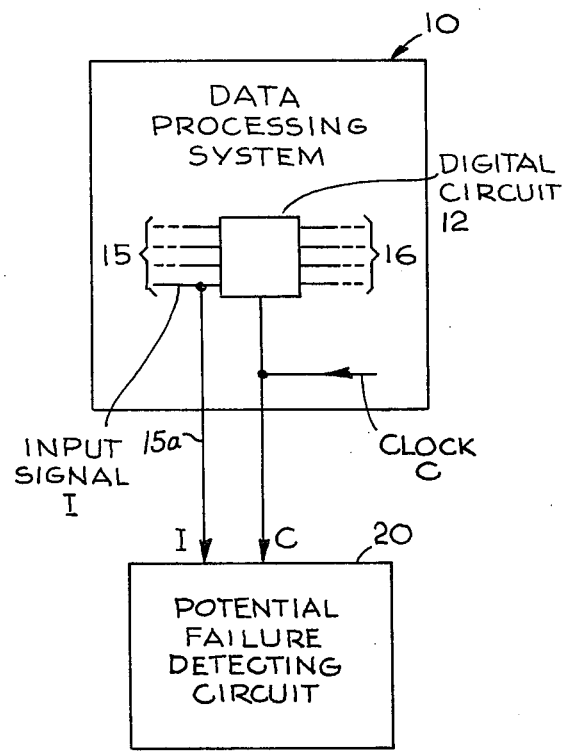
FIG. 1 is an overall block diagram illustrating how the present invention may typically be employed in conjunction with a data processing system.

Referring initially to the overall block diagram of FIG. 1, a typical data processing system 10 is shown including, for example, a digital circuit 12 having a plurality of input and output lines indicated generally by numbers 15 and 16. For the purposes of this description it will be assumed that the digital circuit 16 receives a digital input signal I on input line 15a, and that the circuit 12 is designed to respond to this input signal I in response to the trailing edge of a clock C also applied to the circuit 12, as shown.

The particular construction and operation of the digital circuit 12 generally shown in FIG. 1 may be provided in many ways, but since such details are not necessary to a full and complete understanding of the invention, they are not shown. For the purposes of the present invention, it will be sufficient for the preferred embodiment of the invention being considered to assume that the predetermined criteria which the input signal I should meet with respect to the digital circuit 12 are that the input signal be stable for at least a predetermined time period T beginning at a predetermined time $t_1$ prior to the occurrence of the trailing edge of the clock C, and terminating at a predetermined time $t_2$ subsequent to the trailing edge of the clock C.

Still with reference to FIG. 1, a potential failure detecting circuit 20 is provided in accordance with the invention for detecting the possibility of a potential failure during actual operation of the digital circuit 12 in the data processing system 10 when no failure has occurred. For the purpose of the preferred embodiment being considered herein, the input line 15a to which the digital input signal I is applied is connected to the potential failure detecting circuit 20 along with the clock C during normal operation of the data processing system 10. It will be understood that, depending upon the particular criteria chosen to be tested by the potential failure detecting circuit 20, any particular desired combination of the digital circuit input and output lines 15 and 16 may be selected for connection to the detecting circuit 20. It will also be understood that such connections may typically be provided in the case of an integrated circuit chip using a conventional form of chip clip. Alternatively, the potential failure detecting circuit 20 could be designed into an integrated circuit chip containing the digital circuit 20.

Figure 2:
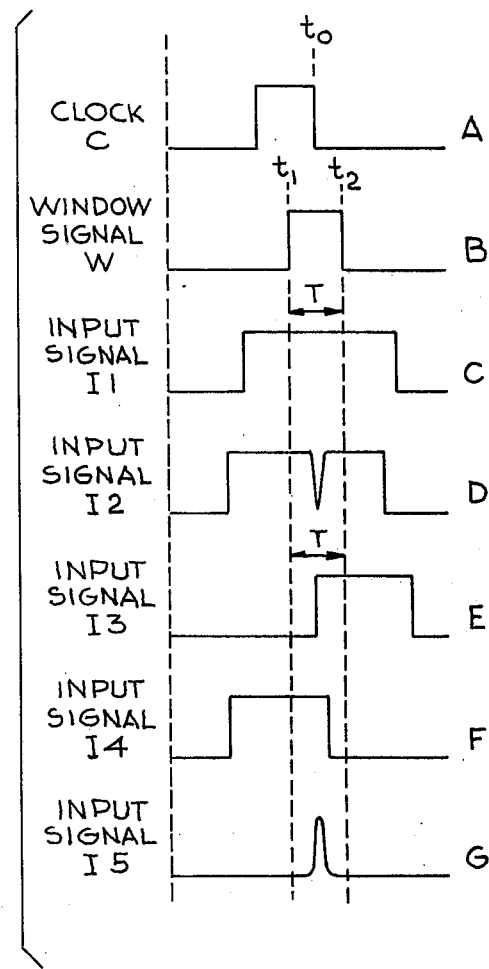
FIG. 2 is a plurality of idealized timing graphs basically illustrating the manner in which a potential failure is detected in a preferred form of the invention.
Figure 3:
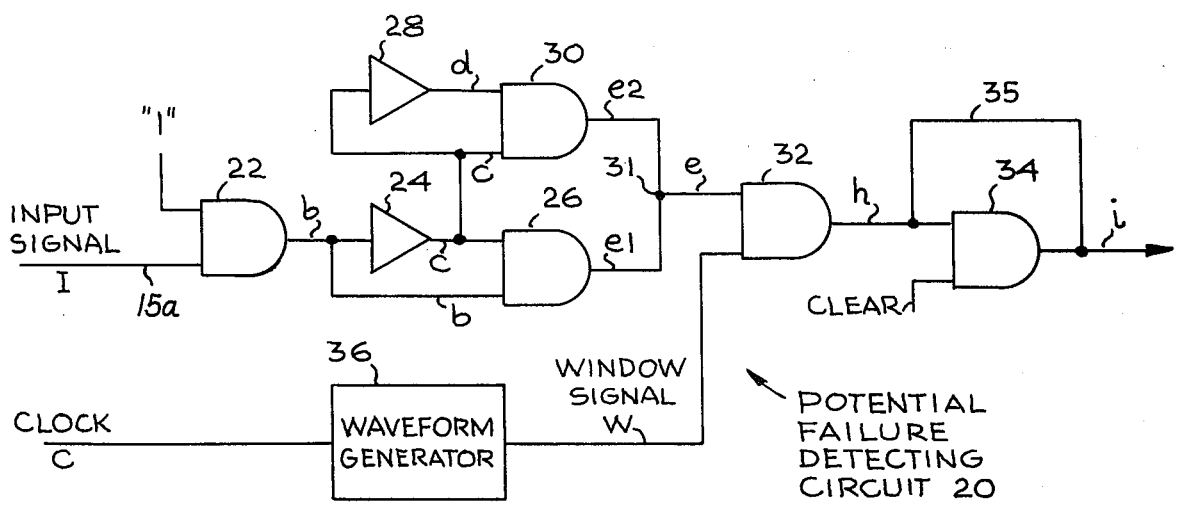
FIG. 3 is an electrical circuit diagram illustrating a preferred embodiment of a potential failure detecting circuit in accordance with the invention.

Reference is now additionally directed to the timing graphs of FIG. 2 which will be used to describe the basic approach employed by the preferred embodiment of the potential failure detecting circuit 20 illustrated in FIG. 3 for providing a detection of the possibility of a potential failure in the operation of the digital circuit 12 of FIG. 1 based upon the input signal I and clock C applied thereto. It is to be understood that the graphs in FIG. 2 are idealized in that signal level changes are shown as vertical transitions so that actual rise and fall times are not shown. This is done in order to permit a simpler and clearer explanation of the invention and those skilled in the art will readily be able to accommodate actual rise and fall times in practicing the invention from the description provided herein.

Graph A in FIG. 2 illustrates a typical device clock C which will be seen to have a trailing edge occurring at a time designated as $t_0$. As mentioned previously, it is assumed that the digital circuit 12 of the system of FIG. 1 which is being tested for potential failure is responsive to the trailing edge of the clock C.

Graph B in FIG. 2 illustrates a window signal W generated by the potential failure detecting circuit 20 of FIG. 3 for use in determining whether an input signal I (such as typically illustrated in graphs C-F in FIG. 2) meets the established criteria relative to the clock C. The window signal W in graph C is chosen so as to be at a true or "1" logical level for a time period T beginning at a time $t_1$ prior to the trailing edge of the clock and terminating at a time $t_2$ subsequent to time $t_0$, thereby establishing predetermined timing criteria relative to the clock C which must be met by an input signal I applied to the digital circuit 12 in FIG. 1.

It will thus now be evident that graph C in FIG. 2 illustrates the situation of an applied input signal I1 which meets the timing criteria relative to the clock C established by the window signal W of FIG. 2, since it is stable over a time period prior to $t_1$ and subsequent to $t_2$. It thus may be concluded that the input signal is not such as to indicate a potential failure situation with regard to the digital circuit 12. To fortify this conclusion, the system 10 containing the digital circuit 12 could be operated under worst case conditions to determine whether the established criteria still remain unviolated.

Graphs D, E, F and G in FIG. 2 will be understood to illustrate various types of signals I2, I3, I4 and I5 which might occur on input line 15a in FIG. 1 which violate the criteria established by the window signal W of graph B, since each has a transition occurring between $t_1$ and $t_2$. Graphs D, E and F illustrate possible input signals which might occur, while graph G illustrates a noise pulse occurring during the window signal period T. Thus, not only does the present invention make it possible to detect potentially faulty input signals, but also permits detecting the possibility of a potential failure or error occurring because of a noise signal occurring during the window signal period T.

Having described the basic approach of the preferred embodiment, the specific manner in which a relatively short duration input signal I of, for example, 30 nanoseconds width, may be tested to determine whether it violates established criteria will now be considered with reference to FIG. 3 which illustrates a particularly advantageous embodiment of the potential failure detecting circuit shown in block form in FIG. 1. Additional reference will also be made to the timing graphs of FIG. 4 for greater ease of understanding. It will be noted that the graphs in FIG. 4 have been given a-i designations corresponding to like designations given to the outputs of pertinent components in FIG. 3 so that the nature of the output signal from each such component output can be readily understood from the corresponding graph in FIG. 4.

Figure 4:
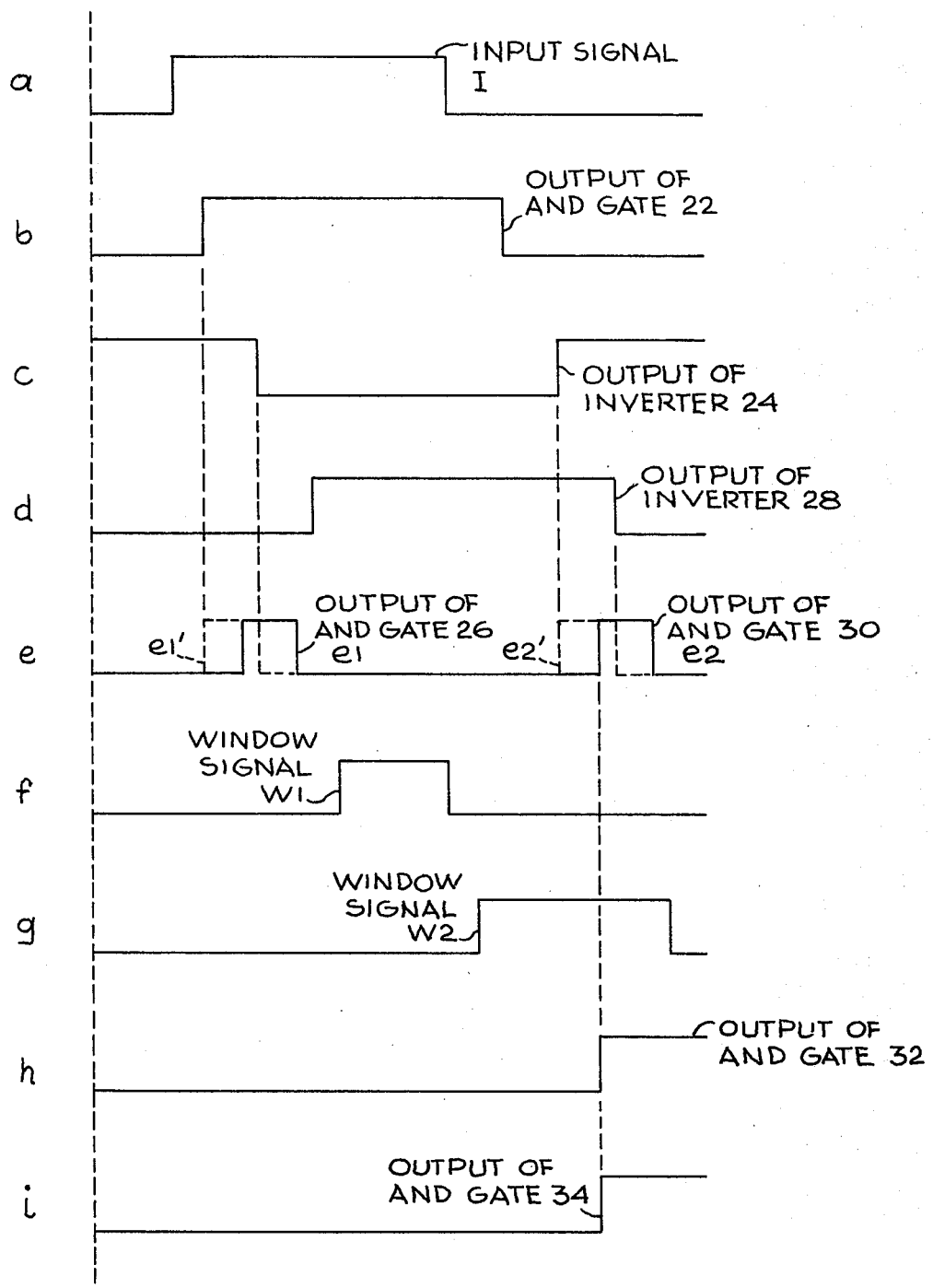
FIG. 4 is a series of idealized timing graphs illustrating the operation of the circuit of FIG. 2.

As shown in the preferred embodiment of the potential failure detecting circuit illustrated in FIG. 3, an input signal I of typically 30 nanoseconds width, such as illustrated in graph a of FIG. 4, is applied to one input of a dual input AND gate 22 having a high input impedance, the other input of AND gate 22 being maintained at a true or "1" level. AND gate 22 thus serves to provide an output signal (graph b in FIG. 4) comprised of the input signal I delayed by an amount equal to the propagation delay through AND gate 22, which may typically be 3 nanoseconds. AND gate 22 may typically be provided using a Fairchild 9863 CTL integrated circuit chip.

The delayed input signal b appearing at the output of AND gate 22 in FIG. 3 is applied to a first inverter 24 and also to one input of an AND gate 26. The output c of AND gate 26 is in turn applied to one input of an AND gate 30, to a second inverter 28, and to one input of an AND gate 30. The output d of the second inverter 28 is applied to the other input of AND gate 30.

Thus, AND gate 26 in FIG. 3 has signals b and c applied thereto so as to produce an output $e1$ constituting the logical product $b \cdot c$ and representing the leading edge transition of the input signal I (graph a), while AND gate 30 has signals c and d applied thereto so as to produce an output $e2$ constituting the logic product $c \cdot d$ and representing the trailing edge transition of the input signal I. Graph e in FIG. 4 illustrates the resulting transition signals $e1$ and $e2$ appearing at the outputs of AND gates 26 and 30, respectively, taking into account the propagation delays therethrough, which may typically be 5 nanoseconds. The resulting logical sum of $e1$ and $e2$ is the signal e which appears at the junction 31 in FIG. 3. For ease of understanding, dashed line signals $e1'$ and $e2'$ are also included in graph e in FIG. 4 in order to illustrate what the locations of $e1$ and $e2$ would be if the propagation delay provided by their respective AND gates 30 and 32 were not taken into account. It should thus now be evident how the inherent propagation delays provided by inverters 24 and 28 are advantageously employed to produce transition signals such as $e1$ and $e2$ for indicating one or more transitions (either positive-going or negative-going) occurring in a signal on input line 15a in FIG. 1.

Inverters 24 and 28 in FIG. 3 may typically be provided using a Fairchild integrated circuit chip. AND gates 26 and 30 (as well as AND gates 32 and 34 to be considered hereinafter) may typically be provided using a Fairchild CTL 9856 integrated circuit chip.

Still with reference to FIG. 3, the resulting transition signal e at junction 31 is applied to one input of AND gate 32 and a window signal W (such as typically illustrated in graphs f and g in FIG. 4) is applied to the other input of AND gate 32. The window signal W may be provided in any appropriate manner in order to establish the desired timing criteria relative to the clock signal C (as previously described in connection with FIG. 2) taking into account the phase shift in the resulting transition signals $e1$ and $e2$. For example, as illustrated in FIG. 3, the window signal W may readily be derived by applying the clock C to a conventional waveform generator 36 for producing a window signal W having the desired period T and location.

Still with reference to FIG. 3 along with the graphs of FIG. 4, it will be understood that the resulting output h from AND gate 32 will become true or "1" only if a transition signal such as $e1$ or $e2$ occurs during the window signal time period. For example, it will be understood that for a window signal W1, such as illustrated in graph f in FIG. 4, the transition signals $e1$ and $e2$ do not occur during the window signal period so that output h from AND gate 32 remains false or "0". However, for a window signal W2, such as illustrated in graph g in FIG. 4, the transition signal $e2$ occurs during the window signal period thereby producing the output signal h illustrated in graph h of FIG. 4.

The output h of AND gate 32 is applied to one input of an AND gate 34 which has its output i connected back thereto in order to permit AND gate 34 to operate as a latch in a well known manner. The other input to AND gate 34 has a clear signal applied thereto which is normally maintained true or "1", but is capable of being momentarily switched false or "0" in order to clear the latch, again as is well known in the art. It will thus be understood that the appearance of a true or "1" signal on output h as a result of the detection of a transition occurring during the window signal period will latch AND gate 35, such as illustrated in graph i of FIG. 4, thereby providing an indication of the occurrence of a potential failure, which indication will be held by the latch until cleared.

It is to be understood that the present invention is not limited to the preferred embodiments disclosed herein, and that many modifications in construction, arrangement, use and operation are possible within the true spirit of the invention. The present invention is accordingly to be considered as including all such modifications and variations coming within the scope of the appended claims.

What is claimed is:

1. Potential failure detecting means for detecting the possibility of a potential failure occurring in a digital circuit while the circuit is operating in a data processing system in a normal manner without failure, said potential failure detecting means comprising:

means coupled to a communication line provided between said data processing system and said digital circuit for deriving a test signal indicative of a signal communicated between said digital circuit and said system during actual operation of said circuit in said system;

criteria establishing means for generating a potential failure criteria signal indicative of predetermined criteria for said test signal, said criteria signal having a predetermined timing characteristic;

comparing means for comparing time relationships between said test signal and said criteria signal; and indicating means responsive to said comparing means for providing an indication of whether said test signal meets said predetermined criteria.

2. The invention in accordance with claim 1 wherein said criteria signal establishes a predetermined time period, and wherein said comparison means includes means for determining whether said test signal is stable over said predetermined time period.

3. The invention in accordance with claim 2, wherein said communication line is an input line, and wherein said comparison means is operative to determine whether a transition occurs in said test signal during said predetermined time period.

4. The invention in accordance with claim 2, wherein said digital circuit operates in response to an applied clock, and wherein said predetermined time period of said criteria signal is chosen to have a predetermined timing relationship relative to said clock.

5. The invention in accordance with claim 4, wherein said predetermined timing relationship between said clock and said predetermined time period of said criteria signal is chosen in conjunction with said comparing means so that said comparing means provides an output signal to said indicating means which indicates whether said test signal is stable from a predetermined time prior to operation of said digital circuit in response to said clock to a predetermined time subsequent thereto.

6. The invention in accordance with claim 3, wherein said comparison means includes means for delaying said test signal, and means responsive to the delayed and undelayed test signal for producing a signal in response to the occurrence of a transition in said test signal.

7. A method of detecting the possibility of a potential failure occurring in a digital circuit while the circuit is operating in a data processing system in a normal manner without failure, said method comprising the steps of:
- deriving a test signal indicative of a signal communicated between said digital circuit and said system during actual operation of said circuit in said system;
- generating a potential failure criteria signal indicative of predetermined criteria which must be met by said test signal in order to obtain reliable operation of said circuit, said criteria signal having a predetermined timing characteristic;
- comparing time relationships between said test signal and said criteria signal to determine whether said predetermined criteria are satisfied; and
- indicating in response to the step of comparing whether said test signal meets said predetermined criteria.

8. The invention in accordance with claim 7 wherein the step of generating provides a criteria signal indicative of a predetermined time perod, and wherein the step of comparing determines whether said test signal is stable over said predetermined time period.

9. The invention in accordance with claim 7, wherein the step of comparing determines whether a transition occurs in said test signal during said predetermined time period.

10. The invention in accordance with claim 7, wherein said digital circuit operates in response to an applied clock, and wherein the step of generating provides said predetermined time period of said criteria signal in a manner so that it has a predetermined timing relationship relative to said clock.

11. The invention in accordance with claim 10, wherein said predetermined timing relationship between said clock and said predetermined time period of said criteria signal is chosen so that the steps of comparing and indicating cooperate to indicate whether said test signal is stable from a predetermined time prior to operation of said digital circuit in response to said clock to a predetermined time subsequent thereto.

* * * * *